Jan. 4, 1949.    J. E. GATCH    2,457,885
TRAILER HITCH
Filed Dec. 5, 1946
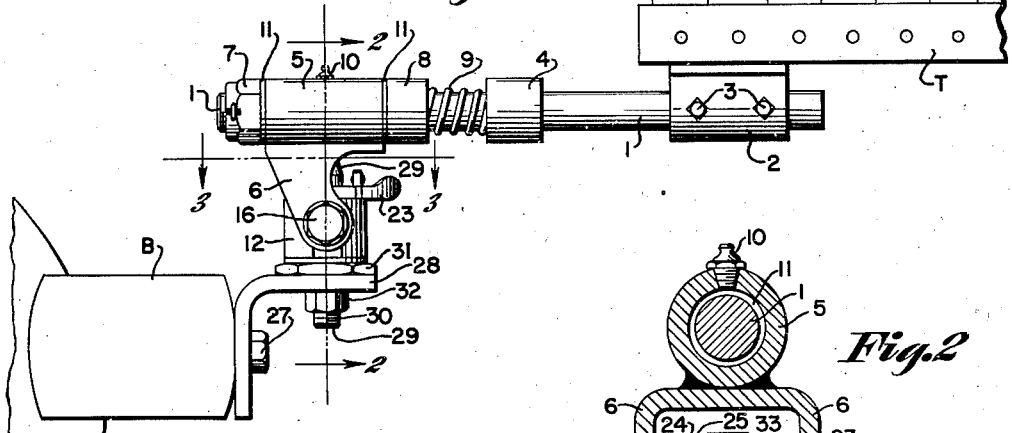
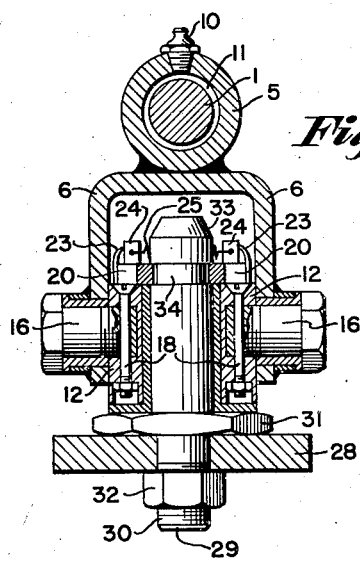
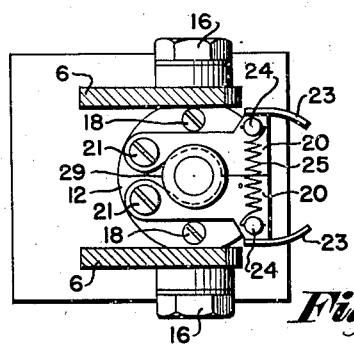
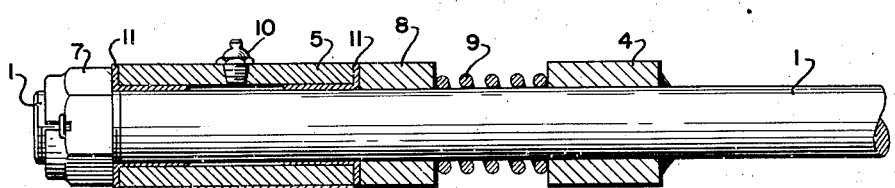
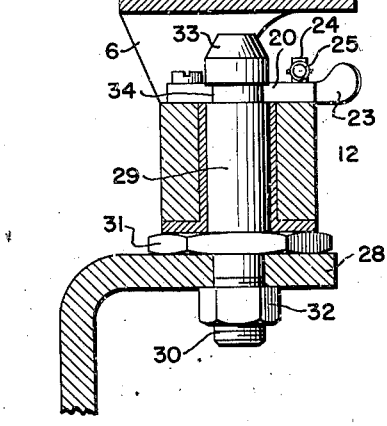
Inventor
J. E. Gatch
By *Munn, Fenwick & Lawrence*
Attorneys Patented Jan. 4, 1949

2,457,885

UNITED STATES PATENT OFFICE 2,457,885

TRAILER HITCH

James Earle Gatch, Macon, Ga.

Application December 5, 1946, Serial No. 714,317

4 Claims. (Cl. 280—33.15)

This invention relates to trailer hitches for connecting trailers, or cars, and has for its object the provision of an improved and simplified device which can be quickly attached or disengaged from a car or the trailer.

A further object of the invention is to provide a device of the character which can be detached or uncoupled with a minimum of effort and without tools.

A further object is to provide a hitch of the type indicated having freedom of movement in all directions so that there can be no binding or undue strain imposed upon either the hitch or the bumper of the vehicle to which it is attached.

A further object of the invention is to provide a trailer hitch in which the locking device by means of which it is engaged or disengaged is subjected to no strain when the device is in operation, and in which the latching device is so constructed as to render the accidental disengagement of the device practically impossible.

Further objects will more particularly appear in the course of the following detailed description.

The invention consists in the novel construction, arrangement and combinations of parts hereinafter more particularly described and claimed.

One sheet of drawings accompanies this specification as part thereof in which like reference characters indicate like parts throughout.

In the drawings:

Figure 1 is a side elevation of the improved device in operative relationship to a car bumper and the body of a trailer, only fragments of the car and bumper being shown;

Figure 2 is a transverse cross section taken on line 2—2 of Figure 1;

Figure 3 is a horizontal cross section taken on line 3—3 of Figure 1;

Figure 4 is a medial vertical longitudinal cross section through the device showing the draw-bar in elevation, and Figure 5 is a perspective view of one latch member removed from the device.

In the embodiment of the invention herein illustrated a draw-bar 1 is provided one end of which is adapted to be received in the bore of a tubular bracket 2 attached to the bottom of the trailer body T. This tubular bracket is provided with transverse locking bolts 3 by means of which the draw-bar is rigidly associated with the bracket and the trailer body.

The draw-bar 1 is formed with a medial enlarged abutment portion 4 and the opposite end of the draw-bar is threaded to receive a nut.

The threaded end of the draw-bar 1 is slidably positioned within the bore of a tubular member 5 which is preferably provided with bushings 11—11 and an oil nipple 10, and a compression spring 9 is positioned on and surrounds the draw-bar 1 between the medial abutment 4 and the tubular body 5. Preferably, a washer 8 will be interposed between the compression spring 9 and the tubular body 5 and after assembling the nut 7, is applied to the threaded end of the draw-bar, thus securing that end of the draw-bar slidably within the tubular member 5. By this construction it will be apparent that the direct draft of the trailer will be taken by the nut 7 against the forward end of the tubular body 5 while any shocks produced by over-riding of the trailer against the car propelling it will be absorbed by the shock spring 9.

The tubular body 5 is formed with downwardly projecting spaced parallel lugs 6—6 which are arranged to straddle a tubular collar 12 and to be pivotally associated with said collar by means of pivot bolts 16—16 which pass through suitable orifices in the lugs 6—6 and are threaded into the side walls of the collar 12. These pivot bolts 16 are secured in their properly adjusted position by bolts 18 which extend through suitable orifices extending lengthwise of the collar 12 and through transverse holes in the pivot bolt 16, as well illustrated in Figure 2.

Preferably the orifices in the lugs 6—6 are sufficiently large to accommodate bushings to prevent undue wear on the pivot bolts.

A king bolt 29 is provided having a medial annular enlargement 31 preferably formed with a polygonal perimeter to serve as a tool grip and the lower end of this king bolt is threaded as at 30 to receive a securing nut 32 by means of which the king bolt can be rigidly associated in a vertical position through a suitable orifice in a bracket member 28 which, as herein illustrated, is of right angle form and secured to the bumper B of the propelling car as by a bolt or bolts 27. The king bolt 29 is further formed near its upper end with an annular groove 34 and its upper free end is tapered as at 33 for ease in assembling the parts.

On the upper face of collar 12 are positioned two parallel spaced latch members 20—20 which are pivotally associated with the collar as by screws 21 and each of these latch members 20 is provided with an arcuate notch 22 adapted to seat in the annular groove 34 in the king bolt 29 when the device is in assembled relationship. On the free ends of each of the latch members 20—20 are upstanding posts 24—24 which are connected by a compression spring 25 tending normally to hold the two latch members in contact. The free ends of each of the latch members 20—20 are formed or provided with a finger grasp 23 by means of which the two latch members 20—20 can when desired be moved outwardly, thus disengaging their notched portions from engagement with the annular groove 34 of the king bolt. When not thus manually forced outward against the compression of spring 25 the two latch members 20—20 will contact each other and in applying the connecting device to the king bolt the beveled end 33 of the king bolt will effectively operate to spread the latch members to bring the same in locking engagement with the annular groove 34 without any undue pressure on said latch members and without any necessity for manually manipulating the same.

When assembled in operative relationship to a car and a trailer, as illustrated in Figure 1, it will be apparent that all of the draft strains will be transmitted directly from the bumper B of the car through the bracket 28, king bolt 29, collar 12, lugs 6, tubular member 5 and draw-bar 1 to the bracket 2 attached to the trailer. To disengage the trailer it will only be necessary to spread the latch members 20—20 apart by means of the finger grips 23 which disengages said latch members from the king pin and permits the raising of the draw-bar, tubular member 5, and collar 12. The trailer can be reattached to the car simply by replacing the collar 12 over the king bolt and pressing same downward, the tapered end of the king bolt automatically spreading the latch members to permit the top of the king bolt to pass between said latch members until they engage the annular groove 34, thus effectively locking the device in operative position.

Various modifications in the precise size, shape and construction of the constituent parts will readily suggest themselves to those skilled in the art, but within the scope of the present invention as claimed.

Having thus fully described my invention, I claim:

1. Hitch for trailer comprising a draw-bar adapted to be associated with the trailer, a collar slidable on the draw-bar, compression means on the draw-bar restraining movement of the collar toward the trailer, means on the draw-bar to prevent withdrawal of the draw-bar from the collar and to carry the forward thrust of the collar in pulling the trailer, a king bolt vertically mounted on a car bumper, a second collar removably and rotatably mounted on the king bolt, and means for pivotally connecting the two collars on a horizontal axis of rotation.

2. Device for connecting a car to a trailer comprising a king bolt formed with an annular groove, means for mounting the king bolt in a vertical position on a car bumper, a collar adapted to rotatably embrace the king bolt having oppositely disposed latch members arranged to seat in the annular groove of the king bolt when the collar is in operative position on said bolt, a tubular housing formed with spaced, parallel off-set lugs adapted to embrace said collar and connected to said collar by aligned pivots, a draw-bar having a medially disposed abutment, one end portion of said draw-bar slidably disposed in the tubular housing and having means to prevent withdrawal therefrom, a compression spring positioned on the draw-bar intermediate the tubular housing and the abutment on the draw-bar, and means for securing the other end of the draw-bar to the trailer.

3. Device for connecting a car to a trailer comprising a king bolt formed with a tapered upper end an an annular groove, means for mounting the king bolt in a vertical position on a car bumper, a collar adapted to rotatably embrace the king bolt having oppositely disposed spring controlled latch members arranged to seat in the annular groove of the king bolt when the collar is in operative position on said bolt, a tubular housing formed with spaced parallel, off-set lugs adapted to embrace said collar and connected to said collar by diametrically aligned pivots, a draw-bar having a medially disposed abutment, one end portion of said draw-bar slidably disposed in the tubular housing and having an end nut to prevent withdrawal therefrom, a compression spring positioned on the draw-bar intermediate the tubular housing and the abutment on the draw-bar, and means for securing the other end of the draw-bar to the trailer.

4. Hitch for trailers comprising, a draw bar formed with an abutment, and adapted to be associated by one end with a trailer, a vertically disposed king bolt rigidly associated with the bumper of a car, a collar rotatably and removably embracing the king pin, a second collar slidable on the draw bar, a compression spring disposed on the draw bar between the abutment and the said second collar, means to prevent withdrawal of the draw bar from the collar and means pivotally connecting the two collars on a horizontal axis.

JAMES EARLE GATCH.

REFERENCES CITED

The following references are of record in the file of this patent:

UNITED STATES PATENTS

| Number | Name | Date |
| --- | --- | --- |
| 1,325,162 | McGriff | Dec. 16, 1919 |
| 1,543,304 | Tomlinson | June 23, 1925 |

FOREIGN PATENTS

| Number | Country | Date |
| --- | --- | --- |
| 421,730 | Great Britain | Dec. 31, 1934 |